United States Patent [19]

Mantha et al.

[11] Patent Number: 5,438,512
[45] Date of Patent: Aug. 1, 1995

[54] METHOD AND APPARATUS FOR SPECIFYING LAYOUT PROCESSING OF STRUCTURED DOCUMENTS

[75] Inventors: Suryanarayana M. Mantha, Webster, N.Y.; Allen L. Brown, Jr., Solana Beach, Calif.; Toshiro Wakayama, Webster, N.Y.

[73] Assignee: Xerox Corporation, Stamford, Conn.

[21] Appl. No.: 139,686

[22] Filed: Oct. 22, 1993

[51] Int. Cl.$^6$ ............... G06F 15/38; G06G 7/60
[52] U.S. Cl. ................... 364/419.1; 395/145; 395/148; 395/600
[58] Field of Search .......... 364/419.1; 395/118, 395/144, 145, 148, 146, 600

[56] References Cited

U.S. PATENT DOCUMENTS 5,173,853  12/1992  Kelly et al. ............ 364/419.1
5,181,162   1/1993  Smith et al. ........... 364/419.19
5,323,312   6/1994  Saito et al. ............ 364/419.1

OTHER PUBLICATIONS

Dawson et al.; "ODA and document interchange. (Office Document Architecture standard)"; *Unix Review;* v8 n3; p. 50(7); Mar. 1990; Dialog: File 675, acc#08239984.

Fanderl et al.; "The Open Document Architecture: From Standardization to the Market"; *IBM Systems Journal;* vol. 31, No. 4; pp. 728-754; 1992.

Primary Examiner—Gail O. Hayes
Assistant Examiner—Stephen R. Tkacs
Attorney, Agent, or Firm—Oliff & Berridge

[57] ABSTRACT

A method and apparatus are provided for specifying layout processing of logically structured documents, that is, specific logical structures, in computer document handling systems. The method and apparatus allow the specification of the generic logical structure of the structured document in terms of relational attribute grammars. According to the invention, these relational attributes have a binary relationship. The generic layout structure for a class of structural documents is also represented in terms of relational attribute grammars. Coordination grammars, also represented in terms of relational attribute grammars, link the elements of the generic logical structure to the generic layout structure. By coordinating the generic layout and generic logical structures, many solutions are available. Preferential specifications are developed to resolve any potential ambiguities between the many solutions, and to select a preferred solution. The specific logical structure is then generated into a specific layout structure using the preferential specifications to resolve any ambiguities occurring as a result of the coordination.

5 Claims, 11 Drawing Sheets

METHOD AND APPARATUS FOR SPECIFYING LAYOUT PROCESSING OF STRUCTURED DOCUMENTS

FIELD OF THE INVENTION

The present invention relates to the specification of layout processing of structured documents in computer based document handling systems. Specifically, the invention is directed to a method and apparatus for specifying the layout of logically structured documents that is, specific logical structures, using relational attributed grammars and coordination grammars among the relational attribute grammars. In addition, the present invention is directed to a method and apparatus for specifying preferential constraints to resolve the potential ambiguities in layout structures derived from logical structures and coordination grammars, and using these preferential constraints to reject sub-optimal solutions.

BACKGROUND OF THE INVENTION

Computer based document handling systems are generally divided into four broad categories: text editors and word processing systems; formatters; syntax directed editors; and specialized tools. Most systems have features from more than one of these four broad categories. For documents in which presentational considerations are important, the documents must be submitted to a formatter for preparation prior to presentation.

Formatters are non-interactive tools that process a document to produce either a display independent or a device dependent layout specification. Documents are submitted to formatters in the form of descriptions on file and they carry out the processing and return the overall results after a certain period of time. High-level formatters work on the basis of a logical description of the document. The user is not required to specify the presentation details desired. The user deals with the logical organization of the document, i.e., the different types of elements that appear in the document, such as, for example, section, paragraph, heading, summary, etc. The formatter handles the layout presentation of these elements. Low-level formatters make it possible to include commands within the document description to enable changes in other characteristics of the document, such as, for example, font, spacing, margins and justification. The present invention is directed primarily to high-level formatters.

Figure 1:
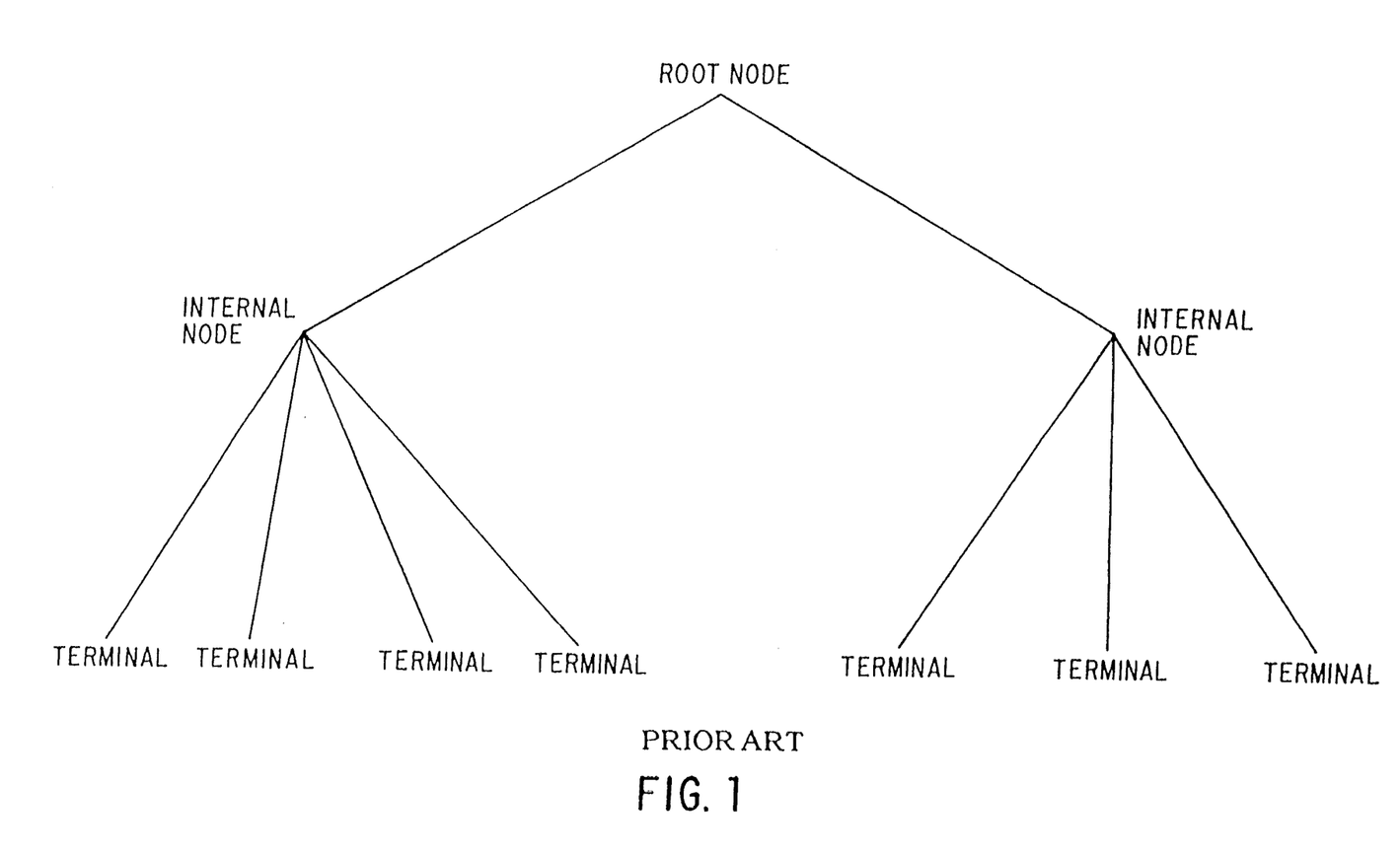
FIG. 1 is an illustrative diagram of an exemplary tree structure.

Most interactive systems allow the user to see the layout of a document as it is being prepared. These interactive systems also separate the logical structure of the documents from the specification of the presentation details. Typically, interactive systems as well as high-level formatters, use a grammatical notation to describe the logical structure of documents. These logical structures are mostly hierarchial in nature and tree structures are used to represent them. FIG. 1 is an illustrative example of a simple tree structure. The structure of a scientific article, for example, could be represented as a following set of grammar rules, or productions:

| Article | → | HeaderBody |
| Header | → | TitleAuthors |
| Title | → | CHAR* |
| Authors | → | CHAR* |
| Body | → | Section* |
| Section | → | SectionTitle Paragraph* Section |
| Title | → | STRING CHAR* |

-continued

| Paragraph | → | Entity* |
| Entity | → | Text\|TABLEEntity\|List |
| Text | → | CHAR* |
| TableEntity | → | TABLE Caption |
| Caption | → | STRING CHAR* |
| List | → | Item* |
| Item | → | ItemMark Paragraph* |
| Item Mark | → | STRING |

In the above set of productions, the words appearing in upper case, such as, for example, CHAR, TABLE and STRING are terminal symbols. Terminal symbols have no further internal structure. The remaining symbols are non-terminal symbols. Symbols are also referred to as element types. A production specifies the structure of a non-terminal symbol on the left hand side. For example, according to the first production, an article is made up from a header followed by a body. The operator "*" denotes zero or more occurrences of the symbol preceding it. Thus, the non-terminal title is made up of zero or more occurrences of the terminal symbol CHAR. The operator "|" denotes alternative representations. Thus, an entity, according to the above production, is either Text, a TableEntity or a List. Some systems also provide the ability to attach attributes to element types. Thus a section, for example, could have attached to it an attribute called language with values from the set of possible languages that a particular section may be in.

Most systems also provide a facility to describe logical structures of documents in the above described manner. A particular document would then correspond to a hierarchial structure, such as, for example, a tree structure, conforming to the productions describing the relationships between the different elements. Referring to FIG. 1, a generic tree structure is shown having a root node, internal nodes and children (also known as terminals). The root node is the base node of the tree. It is the parent of all subsequent nodes shown in FIG. 1 as internal nodes. The children, or terminals, are the lowest elemental units of the tree and are descendants of internal nodes. Using such a hierarchial tree structure, the grammar described in a logical structure for a class of documents is called a generic logical structure. A document instance, i.e., a tree conforming to the grammar, is then referred to as a specific logical structure and is a description of an instance of the class of documents. For example, a particular article is an instance of the class of all articles. A different grammar from the one described above describing the structure of a form, would be another example of a generic logical structure with a particular form corresponding to a specific logical structure.

The image presented on the screen during editing—as well as the image that is printed at the end of processing in batch-oriented systems—is built up automatically from the specific logical structure of the document. Typically, this is based on presentation rules specifying the way in which each element type in a generic document structure is to be displayed or printed. The manner in which presentation rules are specified varies from one system to another. Typically, known systems use the notion of a property sheet or attribute table attached to each document element type. The attribute table contains, for each type of element defined in the generic structure of the class, a set of characteristic formatting attributes of each element type. Using the article example shown above with respect to logical structures, a possible attribute table for some of the element types is set forth below. A question mark is used for attributes whose value can be changed by the user with the value following the question mark being the default value.

| Article: | FontFamily | = | ? (Times) |
|---|---|---|---|
| | MainTextFontShape | = | ? (Roman) |
| | MainTextFontSize | = | ? (10) |
| | MainTextLineSpacing | = | ? (13) |
| | MainHeadingFontShape | = | ? (Bold) |
| | HeadingFontShape | = | ? (Italic) |
| | TextAreaWidth | = | ? (312) |
| | TextAreaHeight | = | ? (528) |
| | AbsoluteTopMargin | = | ? (100) |
| | LeftMargin | = | ? (100) |
| | RightMargin | = | LeftMargin + TextAreaWidth |
| | Language | = | English |
| | PAGINATE (AbsoluteTopMargin, TextAreaHeight) | | |
| Paragraph: | ParagraphNumber = COUNTIN (Section) | | |
| | Indentation | = | |
| | IF ParagraphNumber = 0 THEN 0 ELSE em(FontSize) | | |
| | JUSTIFY (LeftMargin, RightMargin, Indentation, Formatting, Mode, LineSpacing, Language) | | |

The above example shows an attribute table with the values of the presentation attributes for two logical document element types, article and paragraph. There are two procedure calls in the attribute table above. These procedure calls are shown as PAGINATE, at the end of the table for ARTICLE, and JUSTIFY at the end of the table for paragraph. These procedures break articles into pages, and paragraphs into lines, respectively. The parameters of these procedures (which can be set in the attribute table) determine the results of these procedures. For example, they determine the image of the document, how it is laid out in pages, and how the paragraphs are broken into lines.

There are many disadvantages to using the above described prior art approach. The formatting procedures are buried in the implementation of the system and are inaccessible to the user. Any change to these procedures requires a detailed knowledge of the internal data structures and other mechanisms of the system. The only things the user has control over are the attributes that act as parameters to these procedures. It is also difficult to predict the results of formatting by changing the values of one or more of these parameters without being able to see the result. Furthermore, in most systems, the attribute tables for the presentation rules form a part of the logical structure described in the document. This has the disadvantage that it mixes processing information with logical structure information.

SUMMARY OF THE INVENTION

Therefore, what is needed is a method and apparatus to separate the specification of logical structures from processing information, such as layout structures, a method and apparatus to specify layout structures, a method and apparatus to coordinate two different kinds of structures (i.e., logical and layout) and a method and apparatus to compute a member of the layout structure given a member of the logical structure such that the layout structure is coordinated with the logical structure.

It is, therefore, an object of the present invention to provide a method and apparatus that allows the specification of generic logical structures of documents to be represented as relational attributed grammars.

It is another object of the present invention to provide a method and apparatus for specifying the layout structure of the class of logically structured documents, that is, specific logical structures, as a relational attributed grammar.

It is yet another object of the present invention to provide a method and apparatus for specifying a coordination between logical element types and layout element types as coordination grammars in terms of relational attributed grammars.

Another object of the present invention is to provide preferential statements to resolve potential ambiguities or choose among competing specific layout structures derived from a specific logical structure, that is, a structural document.

It is a further object of the present invention to compute an optimal layout for a given logically structured document using the constructions described above.

In order to realize these and other objects and to overcome the disadvantages set forth above, a method and apparatus for determining optimal layout structures of a structured document given a generic logical structure of the structured document comprises: specifying the generic logical structure of the structured document in terms of relational attribute grammars, the relational attributes being specified in terms of binary relationships; specifying a generic layout structure for a class of structured documents in terms of relational attribute grammars; determining coordination grammars for the generic logical structure of the structured document and the generic layout structure of the structured document and expressing the coordination grammars in terms of relational attribute grammars; linking the generic layout structure to the generic logical structure based on the coordination grammars; and converting specific logical structure to an optimal linked specific layout structure using predetermined preference specifications to resolve any ambiguities generated during the linking of the structures.

BRIEF DESCRIPTION OF THE DRAWINGS

The invention will be described in detail with reference to the following figures in which like reference numerals refer to like elements, and wherein.

DETAILED DESCRIPTION OF PREFERRED EMBODIMENTS

While this invention is described in some detail herein, with specific reference to certain illustrated embodiments, it is understood that there is no intent to be limited to those embodiments. On the contrary, the aim is to cover all modifications, alternatives and equivalents following within the spirit and scope of the invention as defined by the specification and claims.

The invention is preferably implemented on a finite state machine based document handling system such as a computer. An example of this type of system is a programmable microprocessor based general purpose computer. However, implementation of this invention is not limited to any particular computer document handling system. A finite state machine is required due to the processing requirement which will become apparent in view of the following detailed description of the preferred embodiments.

Preferably, documents are entered on the general purpose computer by a user via a known word processing package. In future applications, a scanner, having the ability to differentiate and recognize words, can also be used.

Specifications of logical and layout structures are generally transparent to the user. The user will specify the type of document desired and the computer based document handling system will specify the structure or structures from a library of predetermined structures. In addition, for expert users of the system, a user may specify his own structure if the structure is not available in a desired system library. As discussed herein, the specified layout and logical structures are then coordinated, linked and optimized using derived coordination grammars and preference specifications.

Grammars are rules used for specifying structures (i.e., logical and layout structures) within structured documents. Grammars are a very natural means of specifying the logical structures of classes of documents and are used herein to define the structures of the documents discussed. The detailed description will use a simple class of documents to illustrate the characteristics of the invention. However, it is understood that the invention is equally well suited to highly complex structures. Thus, an exemplary grammar for the logical structure of a very simple class of documents such as, for example, articles could be described by the following grammar G:

article→paragraph+
paragraph→WORD+

These rules are also called productions. The grammar G is merely an exemplary grammar representing a very simple and pared down version of the structure of a realistic article. However, for simplicity and illustrative purposes, the above grammar G describing articles will be used. The operator "+" denotes one or more occurrences of the preceding symbol. The grammar G has two non-terminal symbols (article and paragraph) and one terminal symbol (WORD). This grammar conveys that an article is made up of one or more paragraphs which, in turn, are made up from one or more words. The productions above are called production schemes.

An instance of the first production scheme could be, for example:

article→paragraph paragraph paragraph

This production specifies that an article is made up of three paragraphs.

Figure 2:
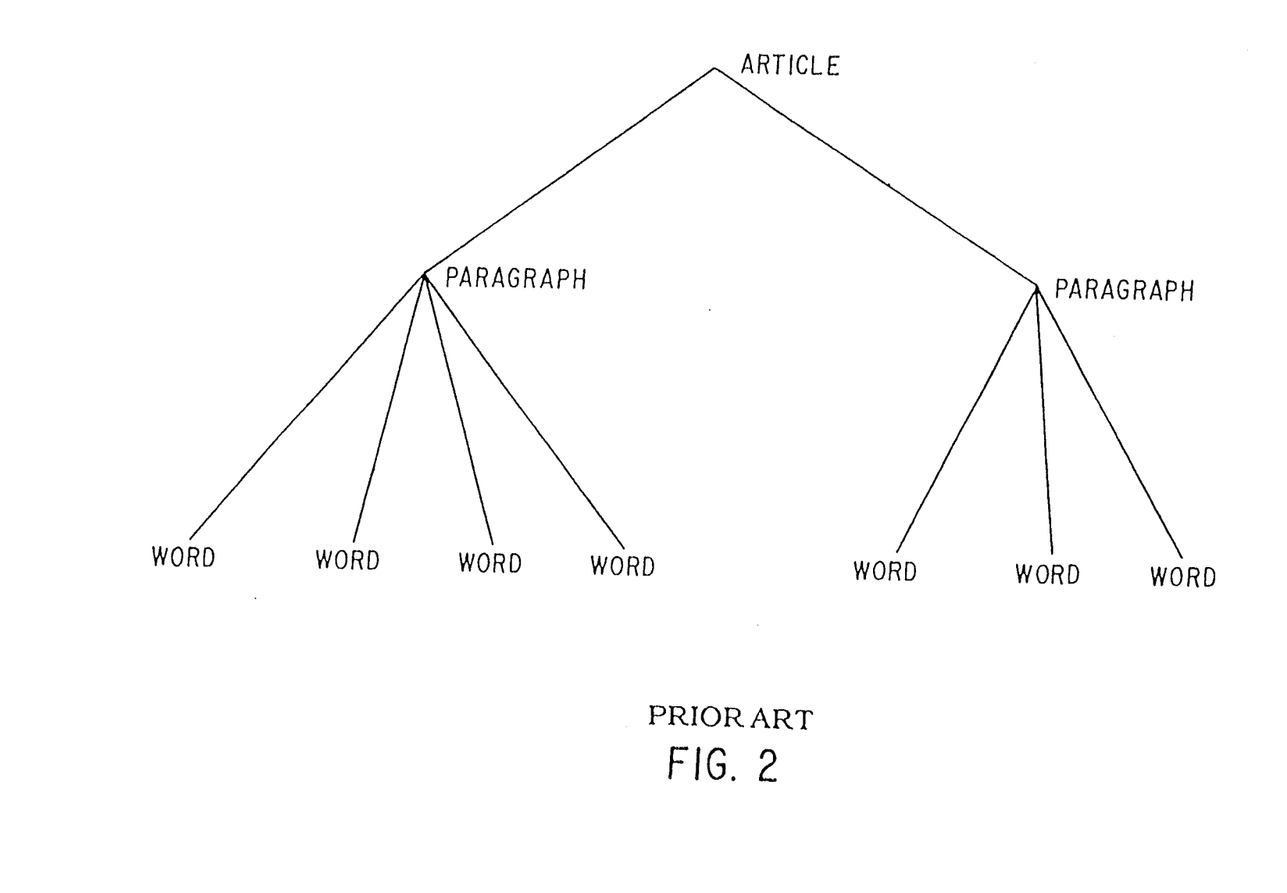
FIG. 2 is an illustrative tree belonging to a grammar describing article.

Referring to FIG. 2, an illustrative example of a tree that belongs or conforms to the exemplary grammar described above is shown. All the nodes of this tree are labeled with symbols from the grammar G. The root node—the node with no parent—is labeled with the symbol article which is also referred to as the start symbol of G. The leaves of the tree—those nodes which do not have any descendants—are labeled with terminal symbols such as, for example, WORD. As can be easily seen from FIG. 2, every node along with its children (i.e., its immediate descendants), forms an instance of some production scheme, with the node representing the left hand side of the scheme and the children representing the right hand side of the production scheme.

Each of these symbols may have various attributes associated with it as described above in the Background of the specification. For example, the non-terminal article could have an attribute called language. The value of this attribute would reflect the language in which the article is written. Paragraph could, for example, have an attribute called number which reflects the number of the paragraph in the article. The terminal symbol WORD could have an attribute such as, for example, content, the value of which would be the string that makes up the word. Existing systems use simple assignments to give values to these attributes. However, the present invention uses a more logical notation for specifying attributes, their values and dependencies among them. For example, in existing systems the fact that an article is in English would be encoded as an assignment to the variable language.

article:language=English

However, in accordance with the present invention, an attribute is a binary relationship between the symbols and the value of the attribute. The attribute for language as described above with respect to existing systems would be expressed in accordance with the present invention, as:

language (article, English)

Thus, the logical predicate of language is satisfied between article and English. Such statements in the syntax presented above are called logical facts.

In another variation from existing systems, the present invention associates the specification of attributes with the grammar productions themselves. This allows the specification of dependencies among attribute values of different symbols in a single grammar production. In the following exemplary logical fact:

number (paragraph [1], 1)
number (paragraph [i+1], x+1) if number (paragraph (i),x)

The first fact specifies that the number of the left most paragraph is 1. The second logical rule specifies that the number of the $(i+1)^{st}$ paragraph is $x+1$ if the number of the $i^{th}$ paragraph is x. Another exemplary attribute dependency among symbols could be an attribute count whose value reflects the number of paragraphs in the article. The value of such an attribute could be specified by the following logical rule:

count (article, y) if number (paragraph [last], y)

The above rule specifies that the value of the count attribute of the article is y if the value of the number attribute of its right-most paragraph child is y. In this example, last is a special word that refers to the last item in any repeated sequence. Count is, therefore, a synthesized attribute of article since its value is synthesized from the values of attributes of the children of article. Therefore, for exemplary purposes, we denote $G_{log}$ to be the grammar G along with the above-identified attribute specifications.

Figure 3:
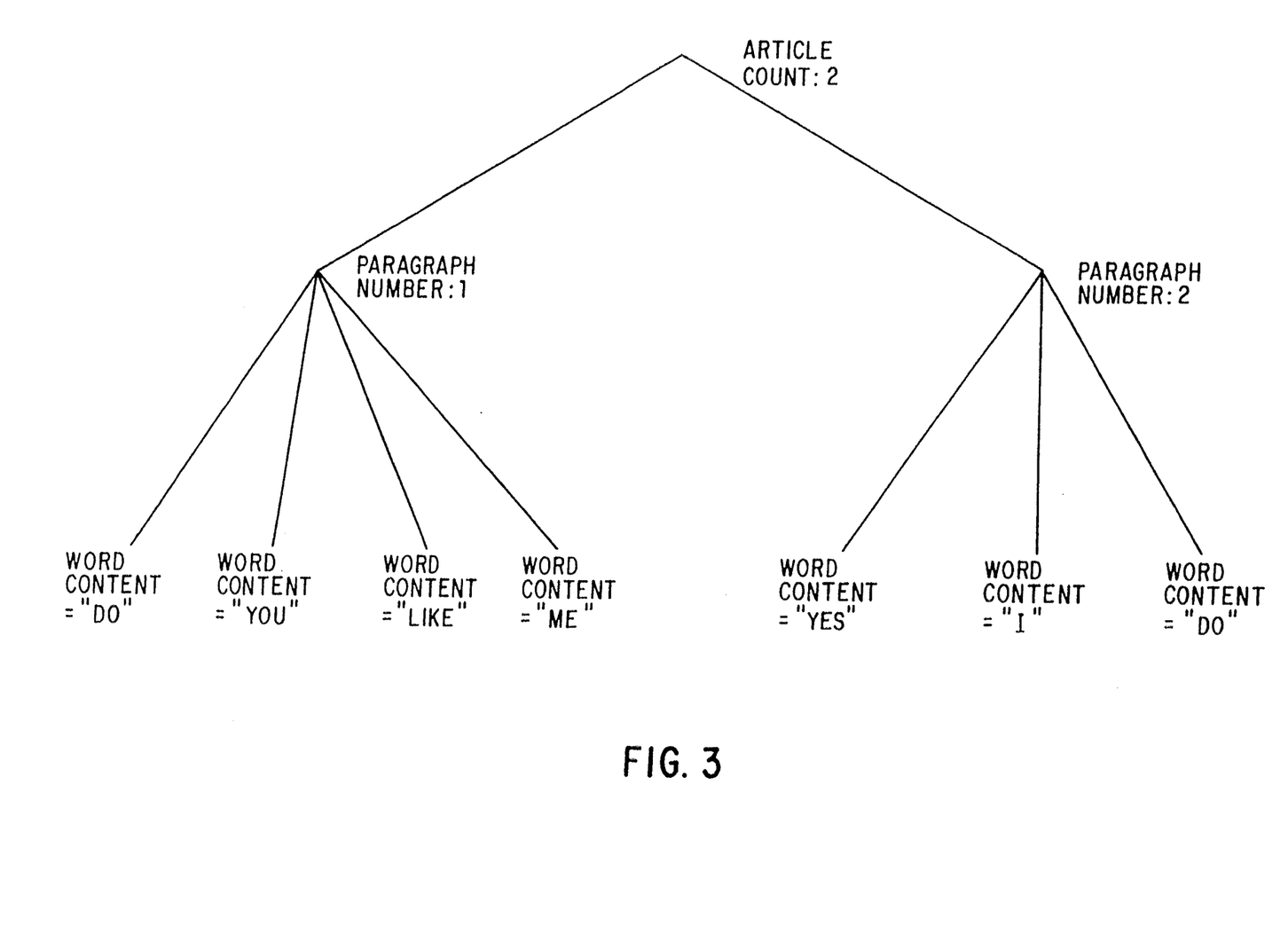
FIG. 3 is an illustrative attributed tree representing an exemplary generic logical structure.

FIG. 3 shows an attributed tree that belongs to $G_{log}$. The tree is syntactically (i.e., structurally) identical to the tree of FIG. 2. However, the tree of FIG. 3 has been decorated with attribute values described above. These values satisfy the attribute specifications attached to the productions in $G_{log}$. These attribute grammars are relational, in that the attribute specifications are given in terms of logical facts and rules.

Generic layout structures can also be defined in the same manner as above with respect to logical structures. For example, a very simple illustrative grammar G' describes the layout of a document as a sequence of pages, and each page is a sequence of lines:

1 articleLayout→page+
2 page→line+
3 line→UNIT+

The non-terminals in G' are articleLayout, page and line. ArticleLayout is the start symbol of G'. UNIT is a terminal symbol.

The grammar G' could then be given some exemplary attributes. For example, the terminal symbol UNIT could have an attribute called content whose value would be the text string that is the actual content held by that UNIT. Another attribute could be an attribute called badness that reflects the compromises that are made in fitting all the UNITS on a particular line. For example, the contents of the UNITS may have to be stretched or squeezed to accommodate all the UNITS on a particular line. The details of the specification of badness are exemplary and are fairly standard in the art. Some other exemplary attributes that may be associated with the line are MainTextLineSpacing, MainTextFontSize, LeftMargin, TextAreaWidth, etc. Such attributes are usually specified for the complete layout structure, i.e., specified at the level of articlelayout, and the various sub-structures such as page and line simply inherit these attributes from their parents. Thus, one could have the following attribute rules attached to the first and the second productions above, respectively:

---
TextAreaWidth(page, w) if TextAreaWidth (articleLayout, w)
TextAreaWidth(line, w) if TextAreaWidth (page, w)
---

Figure 4:
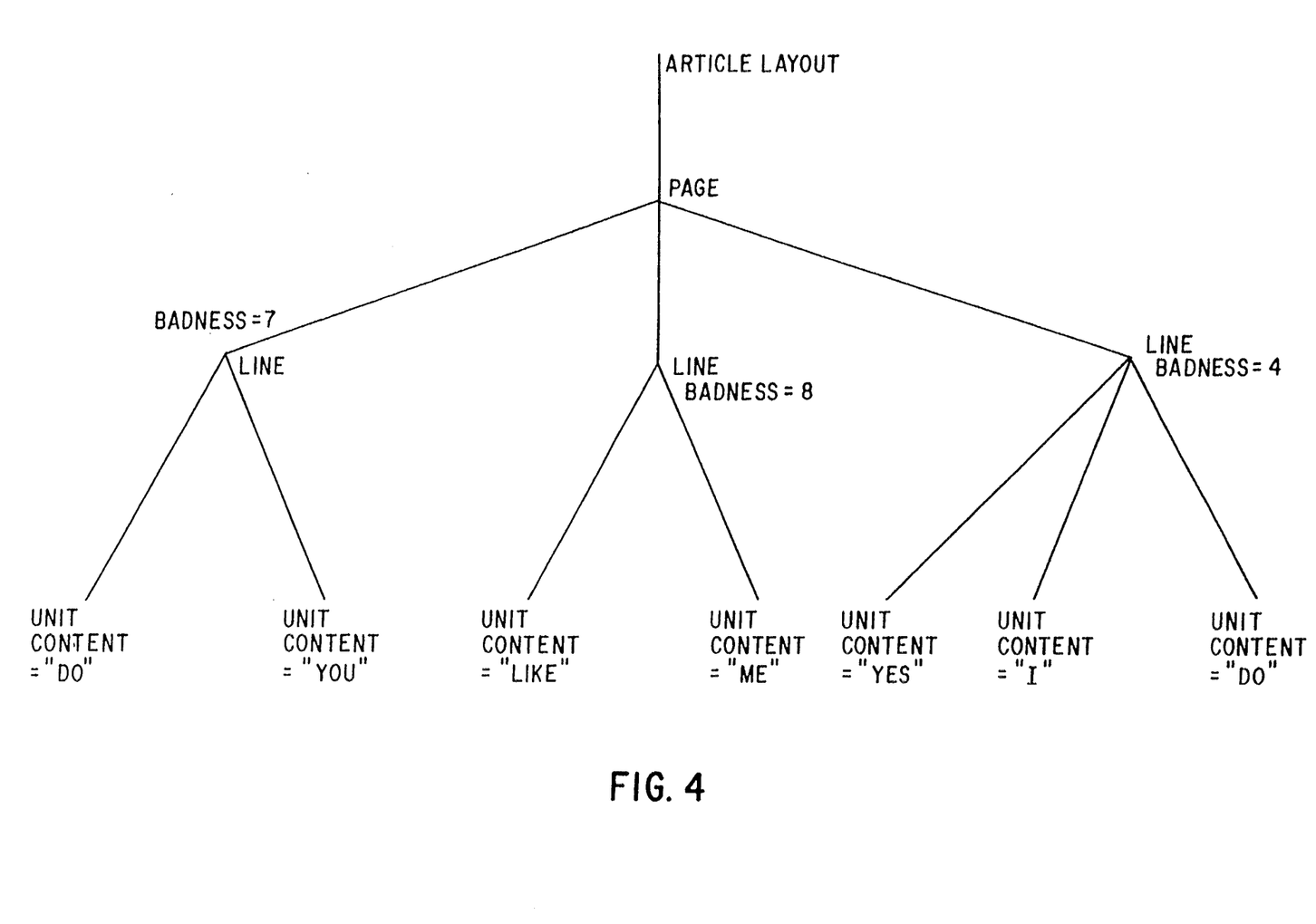
FIG. 4 is an illustrative attributed tree for an exemplary generic layout structure.

Other inherited attributes are similarly passed down from the start symbol of the grammar to the other symbols. In this example, $G_{lay}$ will denote the grammar G' with the above described attribute specifications. FIG. 4 shows a tree that belongs to the grammar $G_{lay}$.

Once the tree structures of $G_{log}$ and $G_{lay}$ are determined, the logical structures must be linked with the layout structures. This is done at the level of the generic structures. To do this, coordination grammars are derived for relating logical and layout structures. Thus, the following constraints must be met. First, there should be a layout structured tree having a root node labeled with articleLayout corresponding to each logical structure tree with the root node labeled with article. Next, there should be a sequence of layout trees with their root nodes labeled with line, corresponding to each logical structure sub-tree with a root node labeled with paragraph, reflecting the fact that a paragraph is laid out as a sequence of lines. Next, every WORD in the logical structure corresponds to a UNIT in the layout structure. Such coordinations (or linkages), as described above, can also be expressed as grammars. For the coordinations set forth above, the following grammars can be used, each having a single production:

$G_{c1}$: article→articleLayout
$G_{c2}$: paragraph→Line+
$G_{c3}$: WORD→UNIT $G_{c1}$, $G_{c2}$ and $G_{c3}$ are coordination grammars that link logical elements with layout elements. Coordination grammars are also a very natural place to pass information from the logical side to the layout side. Thus, by attaching the following attribute specification to $G_{c3}$:

content (UNIT, c) if content (WORD, c)

The content of every WORD is transferred to the layout side as the content of the UNIT it is coordinated with.

Figure 5:
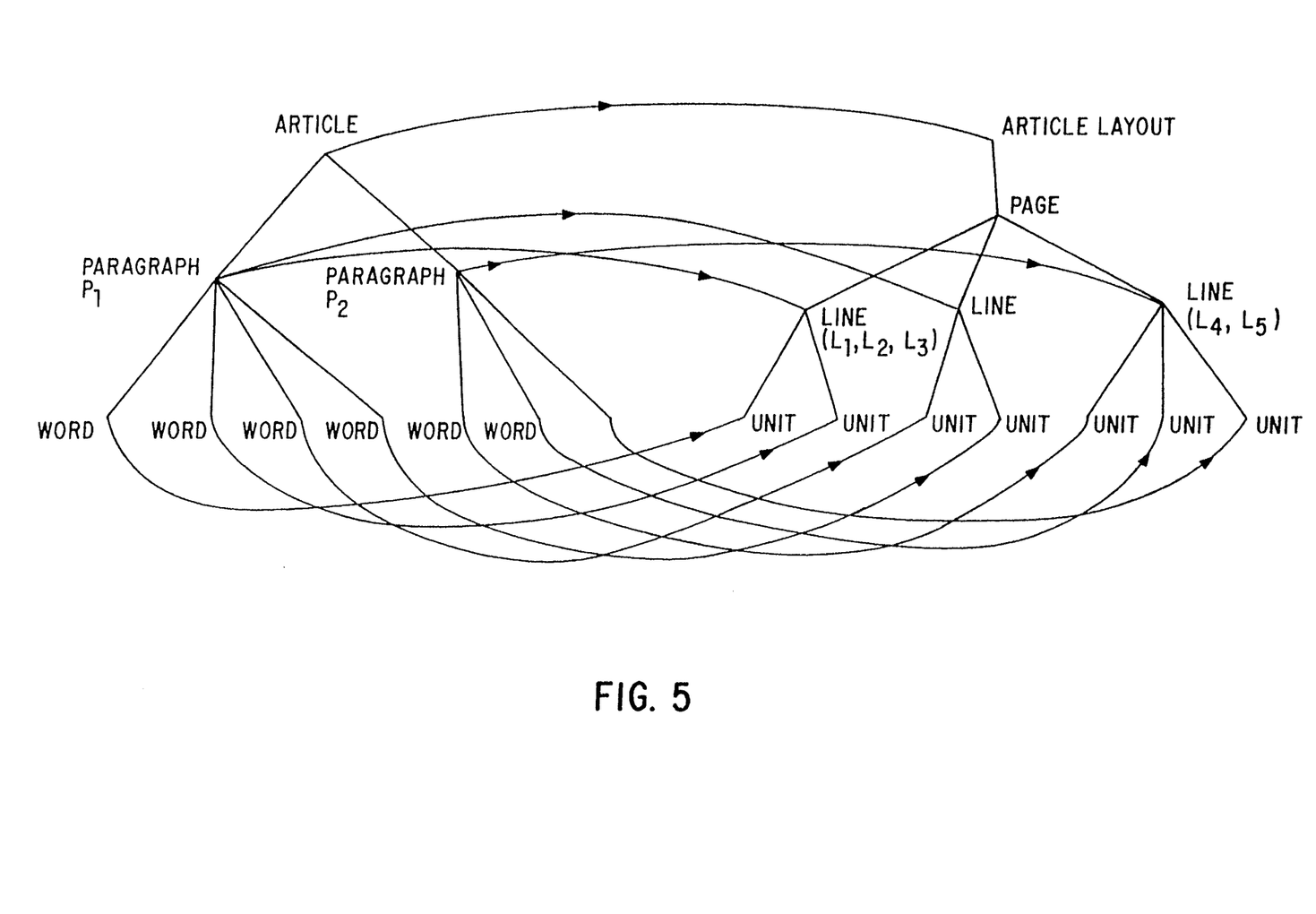
FIG. 5 is an illustrative logical, layout and coordination tree conforming to an exemplary set of grammars.

FIG. 5 shows an exemplary logical tree $T_{log}$ conforming to $G_{log}$, a layout tree $T_{lay}$ conforming to $G_{lay}$ and coordination trees linking the logical element nodes with the layout element nodes. Note that the following ordering properties are satisfied by the coordination:

1. If paragraph $P_1$ appears to the left of $P_2$ in a logical structure, then its layout image (the sequence $L_1$, $L_2$, $L_3$) appears to the left of the layout image (the sequence $L_4$, $L_5$) of $P_2$. Thus, left—right ordering is preserved by coordination.
2. Ancestral ordering is also preserved by coordination, i.e., the layout image of article (which is article layout) is above the layout image of the paragraphs which are lines.

Figure 6:
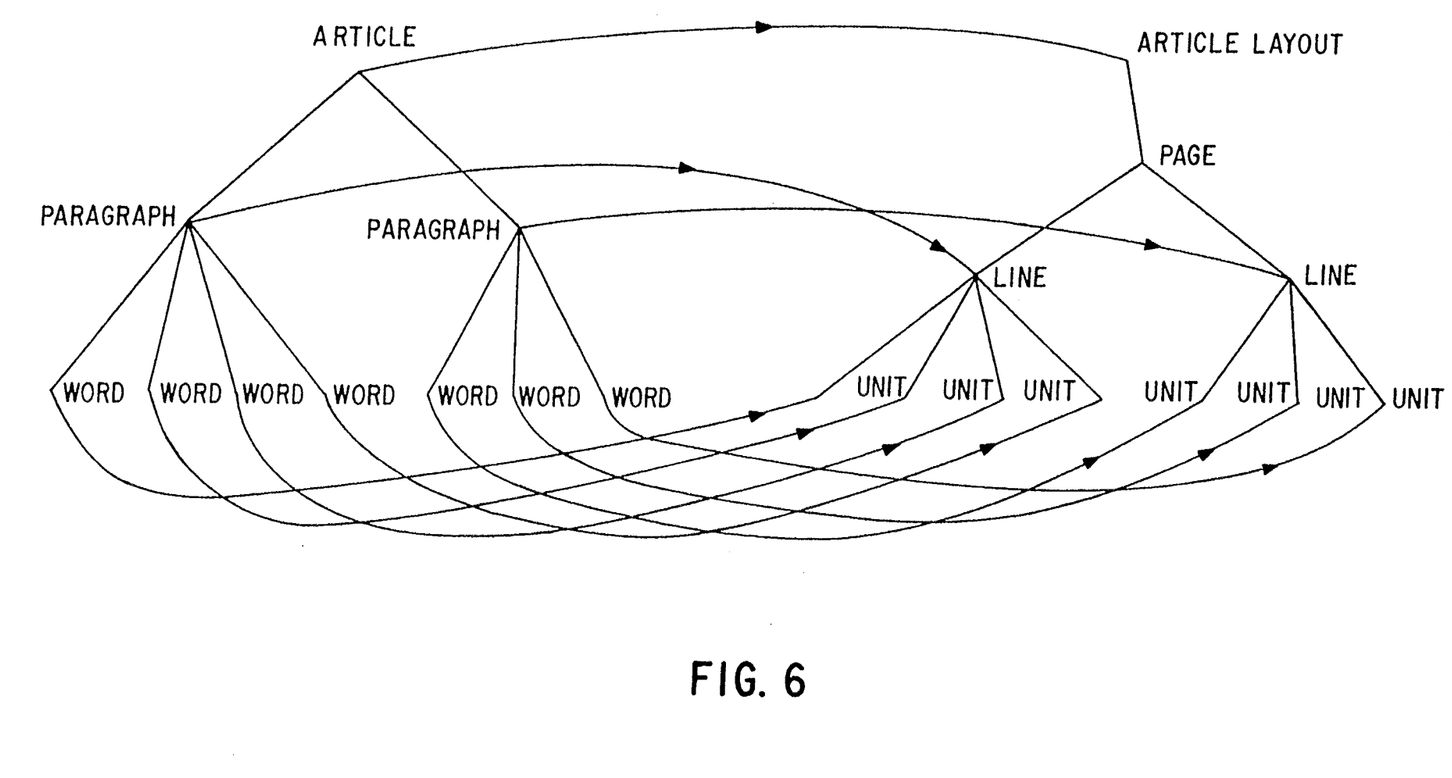
FIG. 6 is an exemplary tree structure highlighting inherent ambiguities in coordination trees.

A feature of logical, layout and coordination grammars is that the specification of the layout is extraordinarily ambiguous. Given a paragraph, the specification can lay it out in lines in many different ways. FIG. 6 shows the logical tree $T_{log}$ as in FIG. 5. However, in FIG. 6, it has been laid out in a different way, i.e., linked to a different layout tree $T_{lay}$. Note that generic structures ($G_{log}$, $G_{lay}$, $G_{c1}$, $G_{c2}$, $G_{c3}$) remain the same. According to the present invention, these ambiguities are handled in a very novel and unique way. As described above, paragraphs have been coordinated using $G_{c2}$ with the single production:

$G_{c2}$: paragraph→line+

In addition, the attribute badness was associated with these lines. An attribute cost may also be associated with these paragraphs. The value of this attribute is obtained by taking the sum of the badnesses of all lines to make up the paragraph, for example. Therefore, this cost attribute can be specified by associating the following rule with $G_{c2}$:

cost (paragraph, c) if $\Lambda_i$ badness (line[i]$b_i$)$\Lambda$ $\Sigma_i b_i$=c The above attribute rule specifies that the cost of a paragraph is the sum of the badness values of all lines in the paragraph. As is readily apparent, there are many ways in which to handle the laying out of the paragraph using the above-identified attributes. For example, the user can pick the paragraph with the lowest cost attribute. Informally, such preference information is associated with $G_{c2}$ by the following statement:

PREFERENCE STATEMENT

Min(cost)

This specification described choosing the layout of a paragraph having the minimum value of cost. $G_{c2}$ along with the attribute rule and the preference constraint is called $G'_{c2}$. The preference specification provides a basis upon which to determine which layouts are better relative to a chosen standard, such as, for example, cost. Note that cost is merely one of many preferential constraints that can be used and that cost is merely used for illustrative purposes. Using preference statements, the user can also reject sub-optimal layouts based on the attributes given to the preference statement.

As shown in the above examples, the logical structure of documents can be represented using attributed grammars. Such grammars describe classes of documents, and each document instance corresponds to a tree of that grammar. Semantic information can also be expressed using attributes. Attribute specification can be attached to the productions of the grammar in the form of facts and rules. Such grammars are called relational attribute grammars, because the attributes are specified as binary relations. This kind of attribute specification should be contrasted with those described in the background where attribute specification is basically used to assign values to variables.

In addition, processing information should preferably be totally separated from the specification of logical structure. Layout structures can also be specified as relational attribute grammars. The linkage or coordination among the logical and layout grammars can also be expressed as relational attribute grammars. Any ambiguities in the specification are resolved by using preference specifications to choose layouts with the lowest values for certain attributes being the selection criteria (cost in our example). Though the specification technique is illustrated using simple examples of logical structure, these principles are applicable to all structures that can be described using such relational attributed grammars.

Given the above description, the problem of generating a specific layout structure (or layout processing) is reduced to the following: given a logical structure grammar $G_1$, a layout structure grammar $G_2$, and coordination grammars $G_{c1}, \ldots G_{ck}$ for them, and given a logical document instance (i.e., a specific logical structure or logical tree), $T_{log}$; a layout tree $T_{lay}$ must be determined. $T_{lay}$ must be consistent with belong $G_2$, be coordinated with $T_{log}$ according to the coordination given by the coordination grammars, and must be optimal among the many different such layout trees, i.e., have a minimal value for all selected preference attributes, for example.

Figure 7:
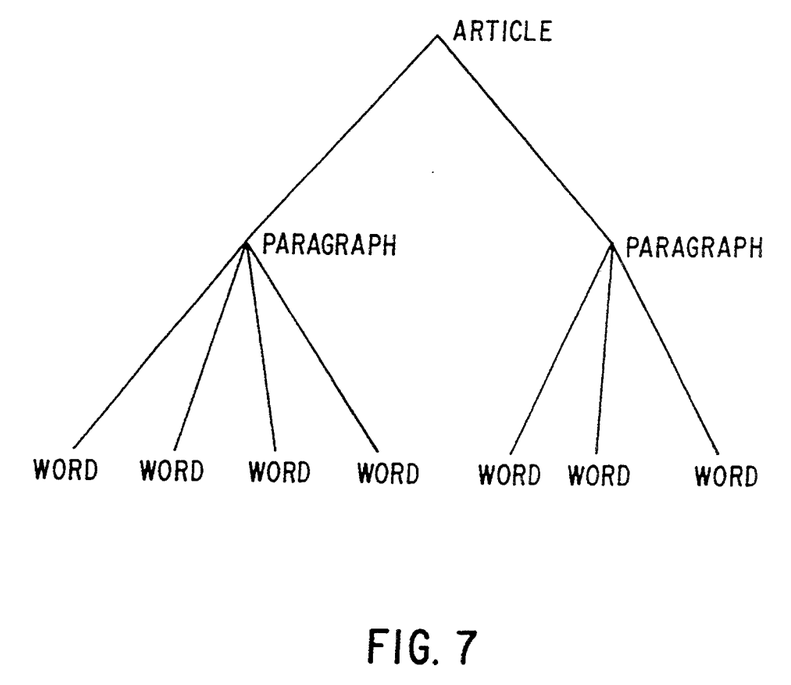
FIG. 7 is an illustrative representation of an initial stage in the computation of an optimal layout tree given a logical tree according to the present invention.

The process of conforming $T_{lay}$ to the above rules uses existing algorithms and techniques for parsing strings in conformance with grammars. Parsing is well known in the art and is described informally below. Informally, a string is a linear sequence of symbols (non-terminal as well as terminal) of a grammar. Given a grammar G, and a string S, the process of parsing is defined as a process of constructing a tree-structure over S such that the root node of this tree is labeled with a start symbol of G, the leaves of the tree are labeled with elements of the string S and the internal nodes of the tree conform to the productions of the grammar. There are well known algorithms that, given a string of symbols S, and a context free grammar G (note that all grammars referred to have been context free grammars), output a parse tree for S if such a tree exists. If such a tree does not exist, these algorithms output a failure message. Given an attribute specification attached to the productions of the grammar G, there are well known algorithms that, given a parse tree T, can decorate it with attribute values, such that these values satisfy the attribute specification and dependency rules of the grammar. These algorithms are called evaluators. Assuming that such a parser and attribute evaluator are known, the construction of the layout tree proceeds in steps from the bottom up. FIGS. 7, 8, 9 and 10 demonstrate the construction of the layout tree for a given logical tree in stages. There are as many stages as they are coordination grammars (there are three in the examples set forth above). FIG. 7 shows the logical structure tree for the exemplary article.

Figure 8:
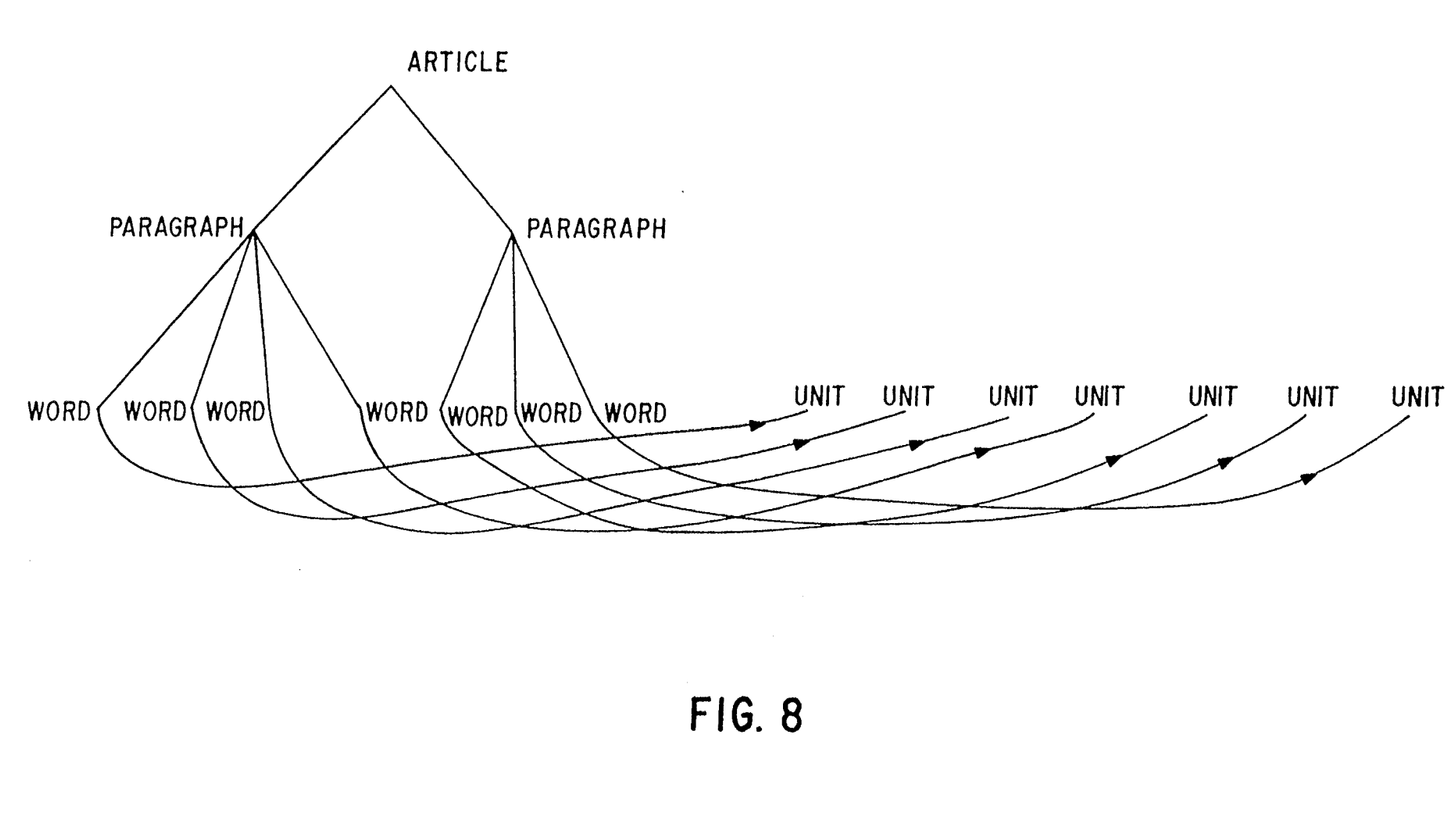
FIG. 8 is an illustrative representation of a first intermediate stage in the computation of an optimal layout tree given a logical tree according to the present invention.

Step 1, illustrated in FIG. 8, is used to generate a string of UNITs from the WORDs (which are at the lowest level in the logical structure). The UNITs are not given to us explicitly. What is given is a logical structure tree (see FIG. 7). Using the coordination grammar for the lowest level logical symbol, as many UNITs as there are WORDs are generated. The evaluator is then called to compute the content attribute of each UNIT.

Figure 9:
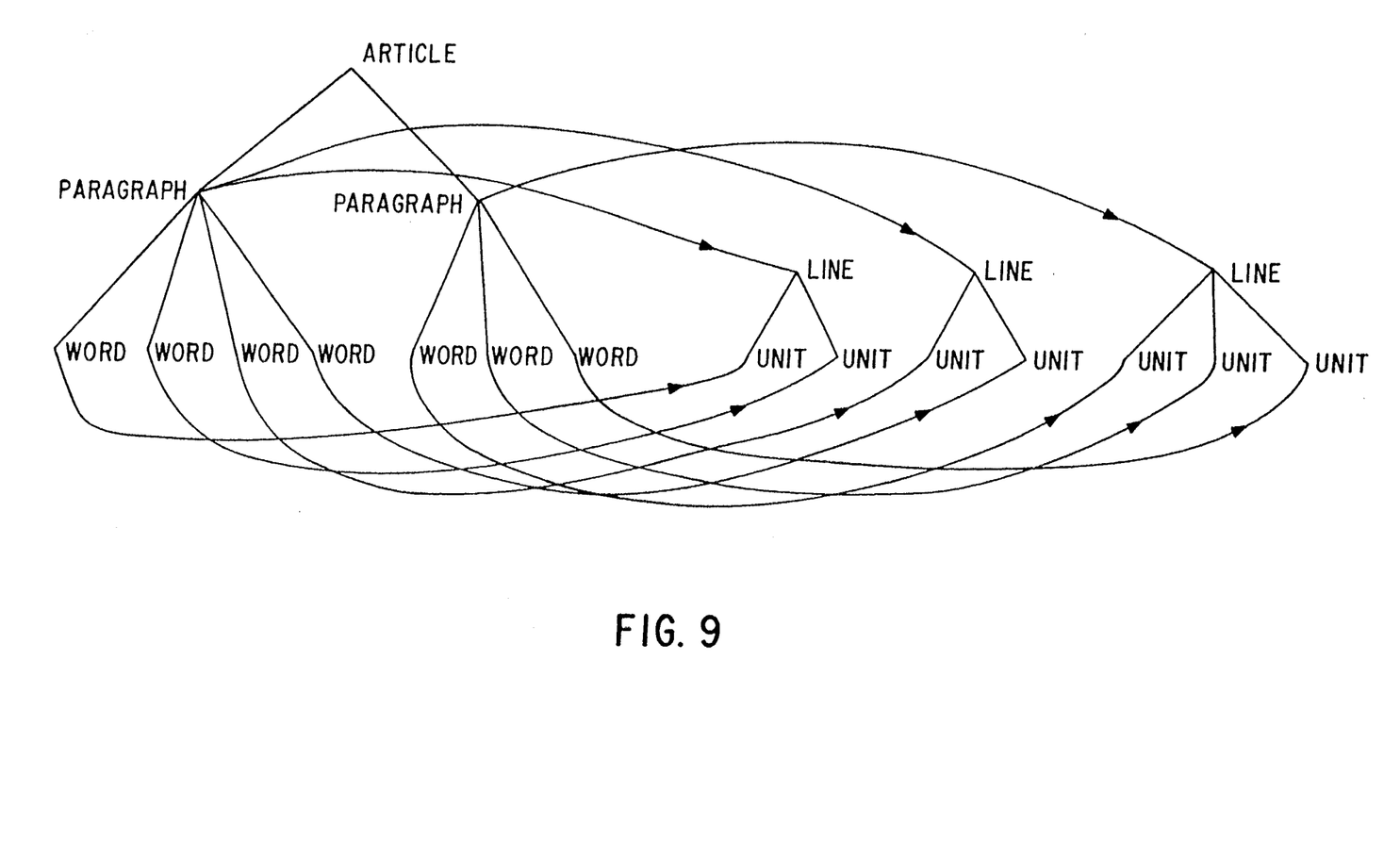
FIG. 9 is an illustrative representation of a second intermediate stage in the computation of an optimal layout tree given a logical tree according to the present invention.
Figure 10:
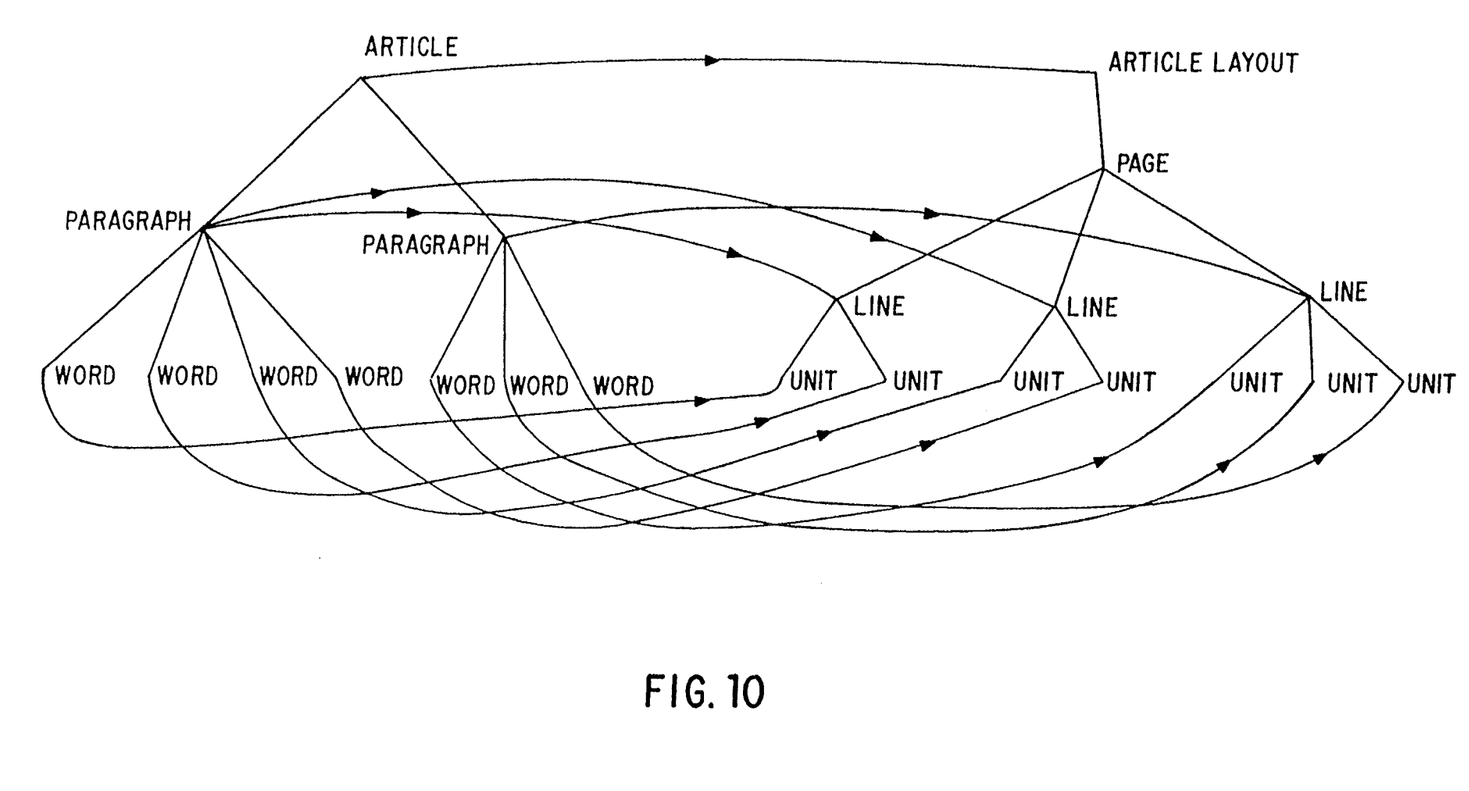
FIG. 10 is an illustrative representation of a final stage in the computation of an optimal layout tree given a logical tree according to the present invention.

In step 2, illustrated in FIG. 9, the parser is invoked as many times as there are paragraphs. For each such call, a grammar ($G_{II}$) that is used by the parser has two productions The first is $G'_{C2}$. The second is:

line→UNIT+

The string input to the parser is a string of UNITs generated from the previous stage (see FIG. 8). Thus, for the parser invocation of the first paragraph $P_1$, the string passed to it is the sequence of UNITs generated by stage I for all the WORDs in $P_1$. Stage II (FIG. 9) builds up the lines in the layout structure. Since the grammar $G_{II}$ is ambiguous, more than one such sequence of lines will be produced. In order to make a selection, the evaluator is called to compute the values of all attributes. In this example, the value of cost is computed for each possible parse (i.e., each way of breaking the paragraph into lines). The parse having the lowest value for cost (or the selected "best" value for any specified preferential constraint) is selected. This process is carried out for all paragraphs.

In the third stage, the parsing is done for the article symbol on the logical side. The grammar used for this stage is $G_{III}$ which consists of the production $G_{c1}$ as well as the following production of $G_{lay}$:

articleLayout→page+ page→line+

The input string to the parser for this grammar is the sequence of lines generated from stage II.

Figure 11:
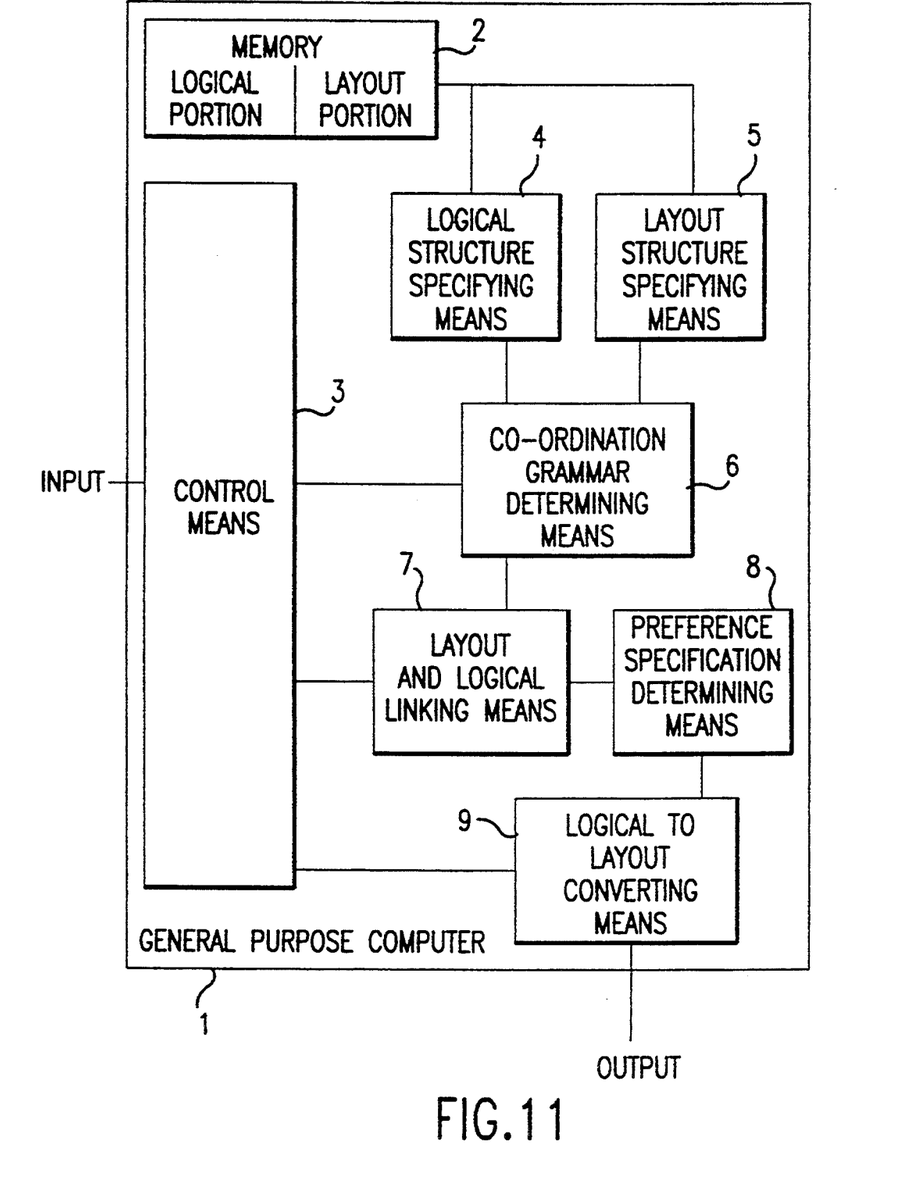
FIG. 11 is an illustration of an implementation of the invention on a general purpose computer.

FIG. 11 illustrates the invention implemented in a general purpose computer 1. The general purpose computer 1 stores a logically structured document as specific logical structure in a logical portion of a memory 2, a generic layout structure is stored in a layout portion of the memory 2.

A control means 3 operates a generic logical structure specifying means 4 that specifies the specific logical structure in terms of relational attribute grammars specified in terms of binary relationships. The control means also operates a generic layout structure specifying means 5 that specifies a generic layout structure for the generic logical structure in terms of relational attribute grammars. In FIG. 11, the line connecting the control means 3 to the generic layout structure specifying means 5 overlaps the line connecting the generic logical structure specifying means 4 to the coordination grammar specifying means 6. However, the point of overlap of those lines does not indicate a connection.

The generic logical structure specifying means 4 and the generic layout structure specifying means 5 are connected to a coordination grammar specifying means 6 which is controlled by control means 3. Elements 4, 5, and 6 are connected to a layout and logical structure linking means 7 also controlled by control means 3 for determining an optimal specific layout structure for the specific logical structure using the coordination grammars and preference specifications specified by the preference specification determining means 8 also controlled by control means 3. The layout and logical structure linking means 7 is connected to a logical to layout structure converting means 9 for generating a specific layout structure and is also controlled by control means 3. The logical to layout structure converting means 9 generates a specific layout structure which is capable of being output.

What has been described above is a staged process for building an optimal layout tree for a given logical tree, given the grammatical descriptions of the logical, layout and coordination structures. This type of optimization is called stratified optimization. Thus, the output of any stage is fixed before the next stage is invoked. For instance, there could be some notion of cost attached to pages as well. Such a cost could take into consideration how pages are laid out, how paragraphs are broken across pages and so forth. The procedure that has been described will first get the optimal breaking of paragraphs into lines. These lines will then be input to the parser which will perform the optimal division of the lines in the pages. Thus, optimization is accomplished in strata.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the spirit and scope of the invention as defined in the specification and claims.

What is claimed is:

1. A computer implemented method of determining an optimal specific layout structure of a specific logical structure given a generic logical structure of said specific logical structure, the method comprising the steps of:

specifying said generic logical structure in terms of relational attribute grammars, said relational attributes being specified in terms of binary relationships;

specifying a generic layout structure for said generic logical structure in terms of relational attribute grammars;

specifying coordination grammars for said generic logical structure and said generic layout structure and expressing said coordination grammars in terms of relational attribute grammars;

specifying preference specifications for use in resolving potential ambiguities in determining an optimal specific layout structure;

determining an optimal specific layout structure for said specific logical structure using said coordination attribute grammars and said preference specifications; and generating said specific layout structure.

2. The method of claim 1, wherein said determining step further comprises parsing parts of a plurality of linked layout structures based on a set of context free grammars.

3. The method of claim 1 wherein said generic logical structure is separated from said generic layout structure.

4. An apparatus for outputting a specific layout structure of a specific logical structure based on a given generic logical structure of said specific logical structure, comprising:

means for specifying said generic logical structure of said specific logical structure in terms of relational attribute grammars, said relational attributes being specified in terms of binary relationships;

means for specifying a generic layout structure for said generic logical structure in terms of relational attribute grammars;

means for specifying coordination grammars for said generic logical structure and said generic layout structure and expressing said coordination grammars in terms of relational attribute grammars;

means for specifying preference specifications to resolve potential ambiguities in said layout structures;

means for determining an optimal specific layout structure for said specific logical structure using said coordination grammars and said preference specifications; and means for generating said specific said logical structure.

5. The apparatus of claim 4, wherein said means for determining comprises means for parsing parts of a plurality of specific layout structures based on a context free grammar.

* * * * *